US006665675B1

(12) United States Patent
Mitaru

(10) Patent No.: US 6,665,675 B1
(45) Date of Patent: Dec. 16, 2003

(54) SHARED FILE SYSTEM HAVING A TOKEN-RING STYLE PROTOCOL FOR MANAGING META-DATA

(75) Inventor: Alexandru Mitaru, Beaverton, OR (US)

(73) Assignee: Omneon Video Networks, Sunnyvale, CA (US)

( * ) Notice: Subject to any disclaimer, the term of this patent is extended or adjusted under 35 U.S.C. 154(b) by 408 days.

(21) Appl. No.: 09/657,079

(22) Filed: Sep. 7, 2000

(51) Int. Cl.[7] ............................................... G06F 17/30
(52) U.S. Cl. ............................ 707/10; 714/49; 709/223
(58) Field of Search ............................... 707/10, 103 R; 709/203, 225, 226, 231, 218; 717/108; 714/35, 39, 48, 49; 370/403

(56) References Cited

U.S. PATENT DOCUMENTS

| 5,043,876 A | | 8/1991 | Terry | 707/218 |
|---|---|---|---|---|
| 5,577,212 A | | 11/1996 | Russ | 709/214 |
| 5,600,834 A | | 2/1997 | Howard | 707/201 |
| 5,706,510 A | | 1/1998 | Burgoon | 707/202 |
| 5,758,150 A | | 5/1998 | Bell et al. | 707/10 |
| 5,802,056 A | * | 9/1998 | Ferguson et al. | 370/403 |
| 5,828,876 A | | 10/1998 | Fish et al. | 701/1 |
| 5,878,221 A | * | 3/1999 | Szkopek et al. | 709/218 |
| 6,035,379 A | | 3/2000 | Raju et al. | 711/162 |
| 6,131,117 A | * | 10/2000 | Clark et al. | 709/223 |
| 6,502,213 B1 | * | 12/2002 | Bowman-Amuah | 714/49 |

OTHER PUBLICATIONS

Walker, B., Popek, G., English, R., Kline, C. and Thiel, G., *The LOCUS Distributed Operating System,* Proceedings of the Ninth ACM Symposium on Operating Systems Principles, Oct. 1983 pp 49–70.

Online Computing Dictrionary, *meta–data,* Definition dated Apr. 6, 1997, http://www.InstantWeb.com/foldoc.cgl?meta-data.

David Stevenson, *Token–Based Consistency of Replicated Servers,* Feb. 27–Mar. 3, 1989, pp. 179–183, Palo Alto, California.

*The Locus Distributed Filesystem,* 1985, pp. 29–72.

Definition of word "*token*" from Online Computing Dictionary, InfoStreet, Inc.© Feb. 23, 1999.

Smythe, C., *ISO 8802/5 token ring local–area networks,* Electronics & Communication Engineering Journal, Aug. 4, 1999, pp. 195–207, vol. 11, Issue 4.

* cited by examiner

*Primary Examiner*—Diane D. Mizrahi
(74) *Attorney, Agent, or Firm*—Blakely, Sokoloff, Taylor & Zafman LLP

(57) ABSTRACT

A system is disclosed having shared storage nodes and a number of processing nodes coupled to the shared storage nodes. The storage nodes are to store user data and file system meta-data (FSMD) and can be accessed by the processing nodes. Each respective processing node stores a copy of the FSMD, and can update its copy of the FSMD based upon content of a token received from one of the processing nodes. The processing node adds information to the token that describes a change that node makes to the copy of the FSMD, and then sends the token to another one of the processing nodes. Such a scheme may prove to be a more scalable solution for a shared file system as the number of processing nodes are increased, because the overhead associated with managing the meta-data does not significantly diminish the performance of the storage system as a whole.

15 Claims, 3 Drawing Sheets

SHARED FILE SYSTEM HAVING A TOKEN-RING STYLE PROTOCOL FOR MANAGING META-DATA

BACKGROUND INFORMATION

This invention is generally related to shared file systems and techniques for managing meta-data in such file systems.

Electronic storage typically features a file system program which implements a set of functions related to the storage and retrieval of data. The file system program associates the physical structures in which files and directories are stored, for instance one or more direct access devices (DADs) such as hard disk drives, with logical structures such as file names. In this way, data can be retrieved using the file name, without having to know the physical location of the data.

To allow multiple users access to the same user data, a shared file system program allows client software running on each one of a number of computers to write to or read from the same file stored in one or more DADs. The computers and DADs are connected by high-speed links. For instance, each of the computers and the DADs may be agents on a bus, such as a Fibre Channel (FC) bus. Each computer may communicate with the DADs using the Small Computer System Interface (SCSI) protocol. When a computer instructs the DAD to read or write data it is the "initiator" of the request, and the DAD is the "target". The Fibre Channel bus allows multiple "initiators" to coexist on the same bus. This allows the computers to access the same data stored on the DADs, i.e. allows the computers to implement a "shared file system".

A file system needs two classes of meta-data which provide, (1) a description of the available (free) space on the DADs and (2) a description of the users' data (files). A file system uses meta-data to provide information about and/or documentation of user data managed by the file system. Meta-data may document data about (1) elements or attributes (name, size, data type, etc.), and (2) where the user data is located, how it is associated, its ownership, etc. Meta-data may include descriptive information about the context, quality and condition, or characteristics of the user data.

The meta-data for a file may include (1) the file name, including the file's path in a hierarchical directory, (2) file attributes, ownership, security descriptors, and (3) descriptors of the DAAD addresses where the user data is stored. Whenever a file is written to, renamed, or deleted, its meta-data changes.

For acceptable performance in accessing files in a shared file system, each computer maintains a copy of the file system meta-data in its own internal solid state random access memory (RAM). Any changes made to the file system meta-data need to be carefully managed across all of the computers, so that each computer has a consistent view of the file system. In essence, (1) a computer needs to lock the file system meta-data (the whole meta-data or just specific portions) in order to gain unique control of it; (2) change it in order to perform the specific operation (create a file, delete a file, write data into a file, etc), (3) share the changes with all other computers so each computer maintains in its RAM the same image of the meta-data and (4) unlock the file system meta-data to allow other computers to perform their own operation.

One way for managing access to and thereby maintaining the consistency of meta-data in a shared file system is to provide locking and unlocking primitives using the bus that all computers share to access the DADs. In the Fibre Channel system (running the SCSI protocol) described above, a computer that wishes to change the meta-data attempts to lock a semaphore stored in the memory of one of the DADs. If successful, the computer is allowed to change the meta-data (or a specific portion thereof associated with the particular semaphore). The computer will share the changes with all other computers either by writing the changes to a DAD and instructing the other computers to read them, or by using a network protocol to communicate directly its changes. Finally, the semaphore is unlocked after the update to the meta-data has been reflected in each computer. This technique, however, can hamper the performance of the shared file system, and, in cases of high file system activity, such as during the creation and deletion of a large number of files, considerable delays may be encountered during the locking-unlocking procedure.

Another technique for maintaining the consistency of meta-data uses a reliable multicast or broadcast protocol, to update the copies of the meta-data in each computer. Once again, however, this technique may not scale well when more than a few computers are participating, as meta-data management tends to diminish the performance of the file system as a whole.

SUMMARY

According to an embodiment of the invention, a shared file system is disclosed having one or more shared storage nodes and a number of processing nodes. The processor nodes are connected to each other in a logical ring and to the shared storage nodes. The storage nodes are used to store user data and file system meta-data (FSMD). Each respective processing node has a processor and a memory. The memory contains a number of instructions which, when executed by the processor, cause the respective processing node to (1) disallow modifications to the FSMD until it receives a token, (2) update the FSMD based upon the content of the token received from one of the processing nodes, (3) perform its own changes to the FSMD, (4) append information to the token that describes these changes, and then (5) send the token to the next processing node in the logical ring. Such a mechanism performs two functions in a shared file system: (1) the locking of the meta-data (or a portion of it) and (2) the sharing and updating in each computer an image or copy of the meta-data. Such a scheme has several advantages. For instance, the method may be implemented using relatively high-level software protocols, thus obviating the need for hardware support such as low level networking primitives that implement locking and unlocking of a bus to which the storage nodes are coupled. In addition, there is no need for a reliable multicast or reliable broadcast protocol, thereby providing the potential to scale well when more than a few computers are participating in the shared file system.

For the particular embodiment in which the changes to the FSMD are journaled in non-volatile memory at each processing node, the file system need not update the FSMD to the storage node very often, thereby further improving the performance of the file system while at the same time providing a reliable system in the event of a catastrophic power failure.

A token is a packet of data (of variable length) that is sent from one computer to another. The computers that cooperate in implementing a shared file system establish a logical ring, i.e. a logical sequence for sending this token from one computer to another. For example, if there are three computers A, B, and C, a token can be sent on this logical ring from computer A to computer B, from computer B to computer C and from computer C to computer A. The token performs two functions in the implementation of the shared file system: (1) it allows the locking of file system meta-data, i.e. a computer is allowed to modify the file system meta-data only if it owns the token (the token may be parked in the computer's internal memory) and (2) by appending the descriptions of the modifications to the file system meta-data that each computer performs, the token allows sharing the updates between all computers.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION OF THE INVENTION

Figure 1:
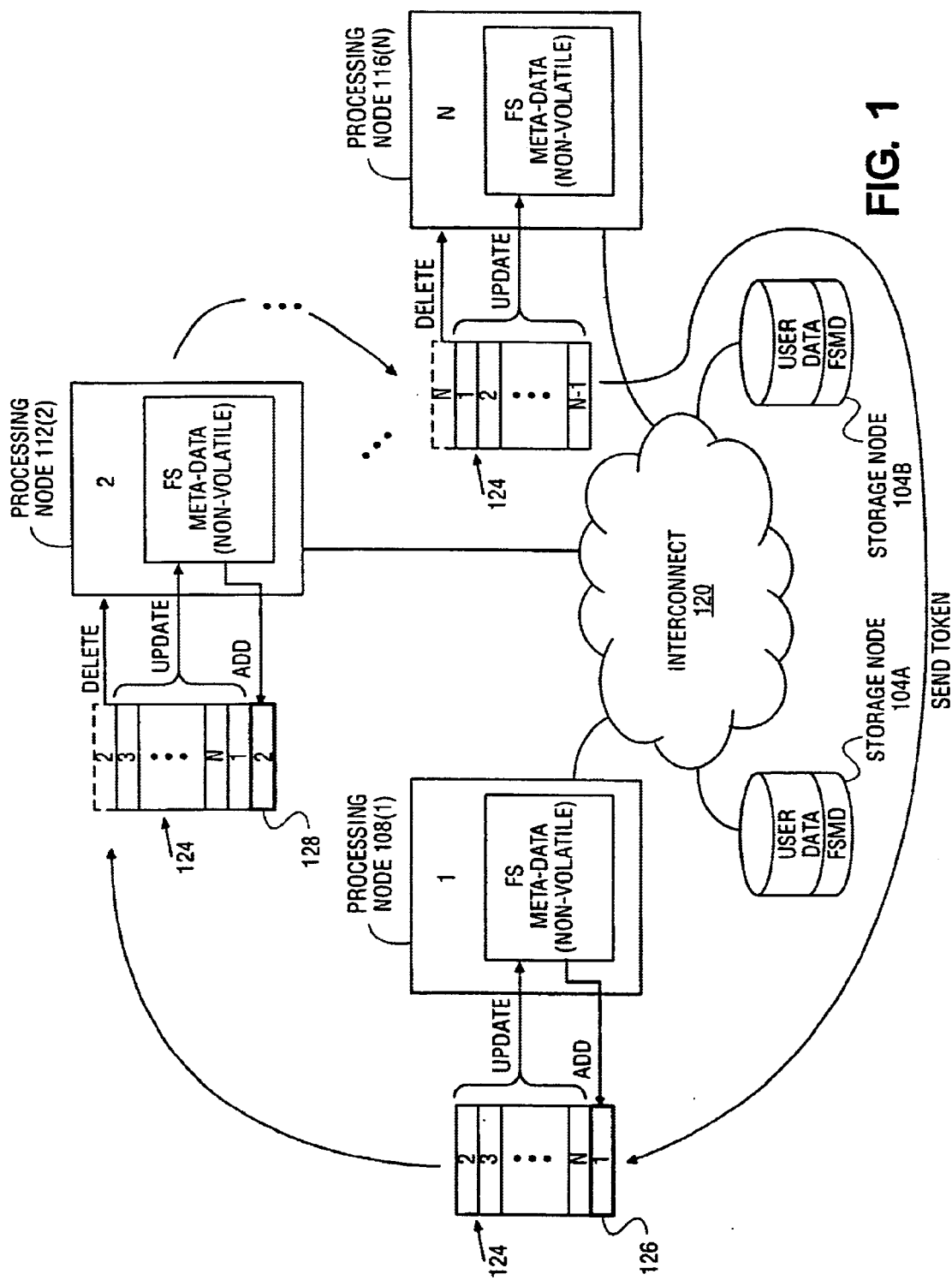
FIG. 1 illustrates a block diagram of a shared storage system according to an embodiment of the invention.

FIG. 1 illustrates a block diagram of a system of processing and storage nodes configured according to an embodiment of the invention. Storage nodes 104a and 104b are provided to store user data and the file system meta-data (FSMD). Reference to FSMD or meta-data here means either the entire meta-data of the shared file system, or a portion thereof. Although only two storage nodes are shown, the invention is not limited to any particular number of such nodes. The user data is stored as named files that are part of a hierarchical file system. The term "files" is generically used here to include any data the user wishes to store and retrieve later using its given name. The actual storage hardware in each storage node may be, for instance, a redundant array of inexpensive disks (RAID) comprising one or more DADs.

Each storage node 104 is coupled to a number of processing nodes 108(1), 112(2), . . . 116(N). Each processing node includes a processor and a memory (not shown) configured according to conventional computing architectures. The memory contains a number of instructions which, when executed by the processor, cause the respective processing node to perform certain operations suitable for managing meta-data. These will be discussed below in connection with the flow diagram of FIG. 2. Each processing node may include, in a further embodiment, non-volatile memory in the form of solid state semiconductor devices, rotating magnetic disks, or other suitable non-volatile medium, to store information that is needed to re-boot the node or the entire shared file system after a catastrophic power failure. Finally, the processing nodes are coupled to the storage nodes 104 through any conventional electronic or optical data interconnect. In a particular embodiment, the interconnect may feature a channel/network standard such as Fibre Channel as described by the Fibre Channel Industry Association. However, other future developments in interconnect technology may also be applicable.

The methodology for managing meta-data calls for each processing node to store a "copy" of the FSMD. The references to different "copies" here does not necessarily mean that the versions of the FSMDs are at all times identical. The copies of the FSMDs in the processing and storage nodes may be different until changes made by one or more of the processing nodes to the file system meta-data are reflected in all nodes. The initial copy may be delivered to each processing node upon startup, from a copy in the storage nodes 104.

Each processing node is to update its copy of the FSMD based upon the content of a token received from one of the other processing nodes. The token 124 is generically understood here as a packet or amount of data that may, according to any suitable format, contain a payload that in essence describes the modifications to the FSMD performed by the "upstream" processing nodes, i.e. those other nodes which had possession of the token prior to the current node having possession. Thus, when a processing node receives the token, that node updates and thereby makes current its copy of the FSMD, based upon the content of the token.

A processing node may change its copy of the FSMD only if that node holds the token 124. This allows "synchronization" of changes made to the FSMD, so that each processing node is allowed to change the FSMD in a deterministic manner. Changes to the FSMD that are made by a processing node are described and appended to the token 124 as a journal piece 126. This is done prior to releasing and sending the token 124 to another processing node.

Note that the accessing of the user data in the shared storage node 104 need not modify the FSMD. Certain file system operations, such as reading user data or overwriting a small amount of user data, do not require any changes to the meta-data, and hence may be performed by a processing node in the absence of the token 124. Also, changes to the FSMD need not involve an access to the storage nodes 104, since the FSMD is kept in the memory of the processing node. The creation of a file changes the FSMD by introducing a new name of the file, file attributes, a date of creation of the file, as well as the size and location of the file in the storage nodes 104. Deleting a file will change the FSMD by freeing a file name from a name space of the shared file system. Writing to a file changes the FSMD by changing the number and/or location of the data blocks in the storage nodes 104 that actually house the user data.

The FSMD may also include allocation tables. File write operations modify a storage unit allocation table, by indicating that certain blocks that were previously free are now used. Thus, the token may also contain a description of changes that have been made to such a block allocation table, where each processing node has a copy of such a block allocation table. For the sake of brevity, any reference to "FSMD" here is also understood perhaps to include a storage unit allocation table.

Substantially the same operations, including the updating of the copy of the FSMD and adding information to the token that describes further changes to the FSMD, may be performed by the other processing nodes once they are in possession of the token. For instance, the processing node 112(2) may add its journal piece 128, and so on until processing node 116(N).

Figure 2:
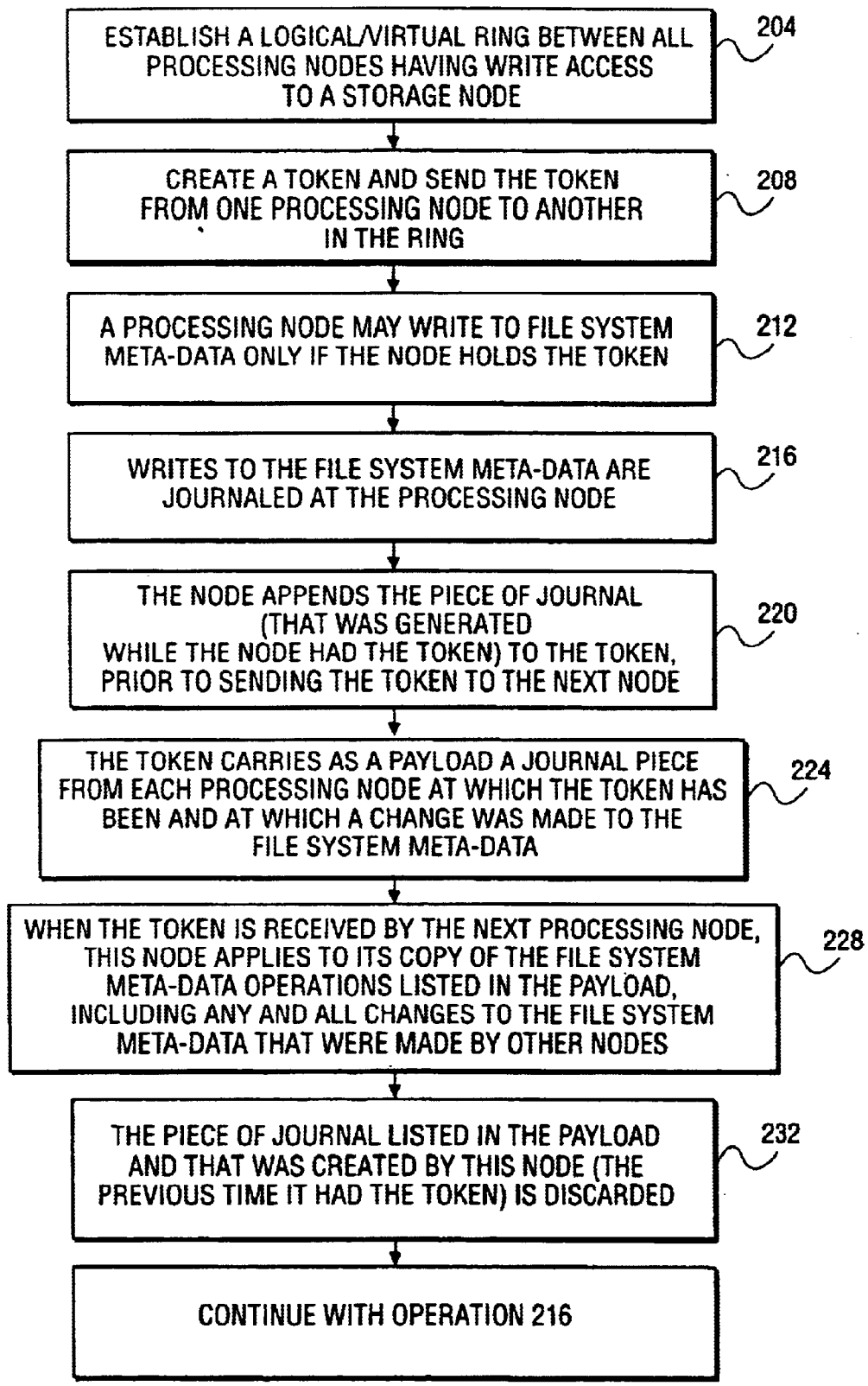
FIG. 2 depicts a flow diagram of operations for managing meta-data in a shared storage system.

Turning now to FIG. 2, and also referring to elements of FIG. 1, a flow diagram of an embodiment of the meta-data management scheme is shown. The flow begins with operation 204 in which a logical/virtual ring is established between all processing nodes having write-access to the shared storage nodes 104. In addition, in operation 208, the token 124 is created where the token is to be sent from one processing node to another in the ring. Operation 212 provides that a processing node may modify the FSMD (i.e. its copy of the FSMD) only if the node holds the token 124. Operation 216 is provided so that changes by a processing node to its copy of the FSMD are journaled at that node.

The flow continues with operation 220 in which the processing node having the token appends its piece of journal (that was generated while the node had the token) to the token, prior to sending the token to the next node. Thus, in FIG. 1, it can be seen that processing node 108(1) adds an amount of information such as its journal piece 126, referenced "1", to the bottom of a stack of other changes made to the FSMD. The token 124 carries as a payload a journal piece from each processing node at which the token has been and at which a change was made to the FSMD. In FIG. 1, these changes are indicated in the token 124 by reference numerals 2 ... N, where the first change at the top of the stack was made by the processing node 112(2) the previous time that node had the token 124.

After the processing node 108(1) has added information describing the new change to the FSMD, the token 124 is sent to the next processing node in the ring, in this case, processing node 112(2). In FIG. 2, operation continues with step 228. When the processing node 112(2) receives the token 124, this node applies to its copy of the FSMD the operations listed in the payload of the token 124, including any and all changes to the FSMD that were made by all other nodes, namely nodes referenced 1 and 3 ... N. Once updated in this manner, the copy of the FSMD may be used by that node to reliably access the storage nodes 104. In addition to the updating of its copy of the FSMD, the processing node 112 (2) deletes the journal piece (referenced "2" at the top of the stack in the payload) that was created by this node a previous time it had the token 124, as in operation 232. This helps keep the payload size from growing too large. Any new changes to the FSMD by this node are journaled, and the node appends this journal piece 128 to the bottom of the stack, prior to sending the token 124 to the next node. When the processing node 112 (2) forwards the token 124 to the next node in the ring, the operations of FIG. 2 may repeat with operation 216 at the next node. Thus, it can be seen that the token 124 is passed around the ring to give each of the processing nodes a chance, and preferably a fair chance, to change its copy of the FSMD.

It should be noted that even if a processing node does not have the token 124, it may still be able to access the user data in the storage nodes 104 if doing so does not require any modification to the FSMD. For instance, file read operations generally do not modify the meta-data, and, as such, may be performed by any processing node without requiring possession of the token 124.

In addition to information concerning changes made to the copy of the FSMD in each processing node, the token payload may also include descriptions of changes made to a block allocation table of the storage nodes 104. To simplify the description of this aspect of the invention, a "change to the FSMD" is also understood as perhaps including a change to the file system block allocation table to indicate which blocks have been freed and which blocks are being used.

Figure 3:
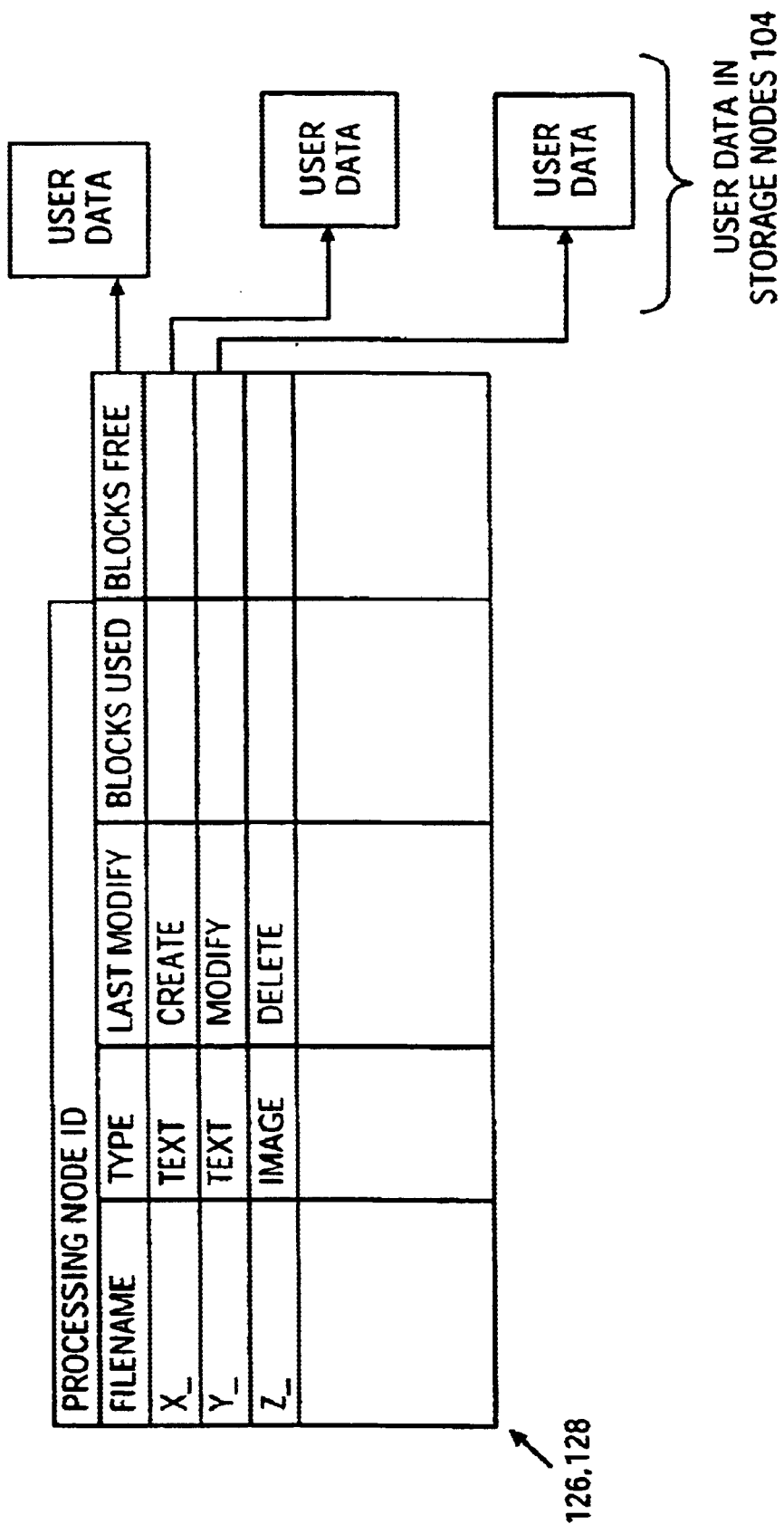
FIG. 3 shows an exemplary format for a token used for managing meta-data in a shared storage system.

FIG. 3 illustrates an exemplary format for each journal piece 126, 128 in the token payload. Each piece identifies the processing node with which it is associated, using for instance a processing node identification code. In addition, the piece contains a list of all changes made to the FSMD by that node. For instance, such changes may include the file name, its type, whether the file was created, modified, or deleted, the blocks currently used by the file, as well as the currently available free blocks. The latter two items may actually be pointers to locations in the storage nodes 104 that contains or may contain the user data. One of ordinary skill in the art will recognize that a wide range of different formats may be developed to hold the information that describes the changes made to the FSMD by each processing node.

To summarize, several embodiments of a method and system for managing meta-data in a shared storage system have been disclosed. The method may provide a more scalable and lower cost alternative to certain conventional techniques for managing meta-data including the use of locking-unlocking low level network primitives and/or reliable multicast or broadcast protocols. In the foregoing specification, the invention has been described with reference to specific exemplary embodiments thereof. It will, however, be evident that various modifications and changes may be made thereto without departing from the broader spirit and scope of the invention as set forth in the appended claims. For instance, the transmission medium and protocol for sending and receiving the token between processing nodes may be the same as the ones used for accessing the user data, or they may be separate for improved performance. The specification and drawings are, accordingly, to be regarded in an illustrative rather than a restrictive sense.

What is claimed is:

1. A system comprising:
   one or more shared storage nodes to store user data and file system meta-data (FSMD); and
   a plurality of processing nodes coupled to the shared storage nodes, each respective processing node having a processor and a memory, the memory containing a plurality of instructions which, when executed by the processor, cause the respective processing node to (1) disallow changes to a stored copy of the FSMD unless a token is present, (2) update the copy of the FSMD based upon content of the token received from one of the plurality of processing nodes, (3) add information to the token that describes a change that node makes to the copy of the FSMD, and then (4) send the token to another one of the processing nodes.

2. The system of claim 1 wherein in each respective processing node, the memory includes further instructions which, when executed by the processor, cause that node to be part of a virtual ring made of the plurality of processing nodes, the token to be passed around the ring to give each of the plurality of processing nodes a fair chance to change a copy of the FSMD.

3. The system of claim 2 wherein in each respective processing node, the memory includes further instructions which, when executed by the processor, delete information in the token that describes a change that node made to the copy of the FSMD a previous time that node had the token.

4. The system of claim 1 wherein each respective processing node further comprises non-volatile memory to store a journal that describes changes made to the FSMD.

5. The system of claim 4 wherein in each respective processing node, the memory includes further instructions which, when executed by the processor, cause that node to write the journal to the shared storage nodes when the non-volatile memory is close to being full.

6. An article of manufacture suitable for use as part of a shared storage system having (1) one or more shared storage nodes to store user data and file system meta-data (FSMD) and (2) a plurality of processing nodes coupled to the shared storage node, each respective processing node having a processor, the article of manufacture comprising:

a machine-readable medium containing a plurality of instructions which, when executed by the processor, cause the respective processing node to (1) disallow changes to a stored copy of the FSMD unless a token is present, (2) update the copy of the FSMD based upon content of the token received from one of the plurality of processing nodes, (3) add information to the token that describes a change that node makes to the copy of the FSMD, and then (4) send the token to another one of the processing nodes.

7. The article of manufacture of claim 6 wherein the machine-readable medium includes further instructions which, when executed by the processor, cause that node to be part of a virtual ring made of the plurality of processing nodes, the token to be passed around the ring to give each of the plurality of processing nodes a fair chance to change a copy of the FSMD.

8. The article of manufacture of claim 7 wherein the machine-readable medium includes further instructions which, when executed by the processor, delete information in the token that describes a change that node made to the copy of the FSMD a previous time that node had the token.

9. The article of manufacture of claim 6 wherein the machine-readable medium includes a non-volatile portion to store a journal that describes changes made to the copy of the FSMD.

10. The article of manufacture of claim 9 wherein the machine readable medium includes further instructions which, when executed by the processor, cause that node to write the journal to the shared storage nodes when the non-volatile memory is close to being full.

11. In a processing node, a method for managing file system meta-data (FSMD), comprising:

disallowing changes to the FSMD unless a token is present;

updating a stored copy of the FSMD based upon content of the token received from one of a plurality of processing nodes;

adding information to the token that describes a change the processing node makes to the copy of the FSMD; and then sending the token to another one of the processing nodes.

12. The method of claim 11 further comprising:

forming a virtual ring made of the plurality of processing nodes, the token to be passed around the ring to give each of the plurality of processing nodes a fair chance to change the FSMD.

13. The method of claim 12 further comprising:

deleting information in the token that describes a change the processing node made to the copy of the FSMD a previous time that node had the token.

14. The method of claim 11 further comprising storing a journal that describes changes made to the FSMD in non-volatile memory.

15. The method of claim 14 further comprising:

writing the journal to the storage nodes when the non-volatile memory is close to being full.

* * * * *